Feb. 1, 1966    T. G. FARIA    3,233,175
ELECTRIC TACHOMETER WITH INDUCTIVE DISCHARGE MEANS
Filed March 7, 1961    2 Sheets-Sheet 1

INVENTOR
THOMAS G. FARIA

BY Fred. E. Shoemaker
Fred L. Witherspoon, Jr.
ATTORNEYS

Feb. 1, 1966 T. G. FARIA 3,233,175
ELECTRIC TACHOMETER WITH INDUCTIVE DISCHARGE MEANS
Filed March 7, 1961 2 Sheets-Sheet 2

INVENTOR
THOMAS G. FARIA

BY Fred E. Shoemaker
Fred L. Witherspoon, Jr.
ATTORNEYS

United States Patent Office 3,233,175
Patented Feb. 1, 1966

3,233,175
ELECTRIC TACHOMETER WITH INDUCTIVE
DISCHARGE MEANS
Thomas G. Faria, 13 Joyce Court, Niantic, Conn.
Filed Mar. 7, 1961, Ser. No. 93,930
4 Claims. (Cl. 324—70)

This invention relates to tachometers, and more particularly to electric tachometer circuits principally intended, but not limited for use with the ignition circuits of internal combustion engines.

It is a general object of the present invention to provide novel and improved tachometers of the type in which measuring is effected by the charging of a condenser by ignition or like pulses and the continuous discharging of the condenser through a summing ammeter which may be calibrated in frequency or r.p.m.

More particularly it is an object of the invention to provide, for use with electric tachometers, means for supplying to such tachometers pulses from the measured source which are free from oscillatory waves whereby superior accuracy is achieved.

An important object of an embodiment of the invention resides in the arrangement of the oscillation suppressing means whereby it is independent of polarization in respect to source polarity.

Another important object of the invention resides in the arrangements for using the oscillation suppressing means as an input circuit to supply both power for operating a transistor type tachometer, and also pulses free of oscillatory waves for the signal input to the tachometer.

Still another object of the invention resides in the adaption of the oscillation suppression means for use between a high voltage spark plug terminal and a transistor or similar type tachometer.

Important features of the invention include:

The use of oscillation suppression means to feed clean signals to a Zener diode or voltage regulator type of tachometer.

The combination of two oppositely connected rectifiers and two condensers in a series circuit therewith to provide oscillation suppression means insensitive to polarization of the voltage pulse source, and for feeding a Zener diode or voltage regulator type of tachometer.

The use of a rectifier in series with the source of oscillating pulses and a condenser to suppress the oscillations together with means to slowly discharge the condenser.

The dual use of a rectifier and condenser to provide both the energizing voltage for a transistor type tachometer and a source of oscillation free pulses to energize the same for counting or summation purposes.

Other and further objects and features of said invention will be more apparent to those skilled in the art upon a consideration of the following specification and the accompanying drawings wherein are disclosed several exemplary embodiments of the invention, with the understanding that such changes and modifications may be made therein as fall within the scope of the appended claims without departing from the spirit of the invention.

Figure 1:
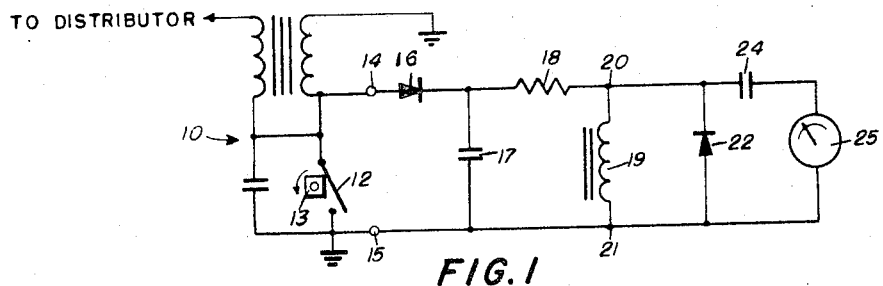
FIGURE 1 is a diagrammatic and schematic showing of an electric tachometer circuit of the present invention shown connected across the breaker points of an ignition circuit such as used on internal combustion engines.

Various types of electric tachometers have been developed for indicating the speeds of internal combustion engines such as used for driving automotive vehicles and for similar purposes, and their many advantages have long been recognized, including the facility with which the indicating instrument may be extended to remote points or used in multiple for indications at several stations, and by the extension only of a two-wire circuit, rather than the use of a flexible shaft with its drawbacks as found in connection with purely mechanical types of tachometers. Other advantages are recognized among which may be mentioned the facility with which such apparatus can be adapted for use for engines having varying numbers of cylinders and different types of ignition, such as battery, magneto and the like each subject to various modifications. Moreover, the electric type may be applied to engines without the necessity for any mechanical drive means, which are not always available, as for instance on outboard engines.

Most known forms of electric tachometers are variously based on charging a condenser successively from the pulses of the primary or secondary circuit of the ignition; apparatus and then discharging the condenser each time through an A.C. milliammeter which acts in a summation capacity to read, in accordance with its graduations in r.p.m.'s or the like.

Such devices suffer from various difficulties, resulting in inaccurate indications, primarily because of the nature of the impulses supplied from the ignition circuit for their operation. Each time the breaker of the ignition circuit opens or closes an electric pulse is generated and fed to the tachometer. Such pulses have an extremely high initial peak voltage and a gradually declining average voltage finally reducing to zero, the latter being characterized by a large number of oscillations with great irregularity and even some reversal of voltage. Early improvements in the action of these devices resulted from the introduction of various types of voltage regulators, the best of which held each pulse to the same maximum voltage value substantially improving the resultant indications, but the circuits still suffered from the oscillatory character of the pulse waves which did not remain constant but varied with changes in the ignition circuit due to wear, erosion of contact points, variation in battery voltage, fouled spark-plugs and the like. Moreover, different ignition circuits varied so in their characteristic output, such as due to various voltages impressed on the spark plugs, variable spark gap distances, that the apparatus had to be either specially designed for each ignition circuit or carefully adjusted thereto. It was difficult to provide standardized equipment for use with motors having different numbers of cylinders and different sources of ignition current.

According to the present invention, most of the difficulties of prior devices are eliminated by suppressing the oscillations of the voltage pulses and carefully regulating their magnitude to be the same in all cases, whereby calibration of the apparatus is very much simplified and accuracy is retained even under the most adverse conditions and circumstances in the ignition circuits.

FIGURE 1 should now be referred to for an understanding of a simplified circuit which is illustrative of the present invention. In this figure the ignition apparatus is generally indicated by the reference character 10 and the showing thereof is not intended to be complete. If a battery is required it should be connected in circuit with the primary of the ignition coil indicated, although the latter could be a portion of a magneto which does not need a battery. In any event, there is a circuit breaker 12 in the primary circuit actuated by cam 13 driven from the motor and the contacts of the breaker 12 are shunted by the condenser indicated. As the breaker opens an electric pulse is created and applied to the terminals 14 and 15, the upper one of which is presumed to have a positive polarity because of the manner in which the apparatus is connected. The output from the terminals 14 and 15 is fed to a series circuit including rectifier 16, preferably of the diode type, poled for forward flow to the right, and a series connected condenser 17 whereby at each pulse the condenser is charged with the upper plate positive. This charge is to the peak voltage from the pulse and the condenser is then slowly discharged back to zero, within the period between pulses, through resistor 18 and inductance 19 in a series circuit around condenser 17. The inductance 19 slows down the rate of discharge of the condenser 17 sufficiently to still permit a voltage pulse of the form of FIG. 3 to exist. The rectifier removes any reverse current among the oscillations and since the voltage in the condenser is at any particular time always greater than the voltage of the oscillatory waves from the dying pulse none of the latter passes through the rectifier 16 to be impressed on the pulse-counting circuit which is connected to points 20 and 21 at the terminals of the inductance 19.

The pulse counting circuit may vary, in accordance with well known forms, but the one illustrated makes use of a Zener diode 22, shunted across the inductance 19 in the direction indicated, whereby its Zener characteristics on backward conduction limit the voltage of each pulse to a fixed value and this voltage is impresed on condenser 24 which is arranged in a series circuit with the A.C. milliammeter 25 around the Zener diode.

Figures 2, 3, 4:
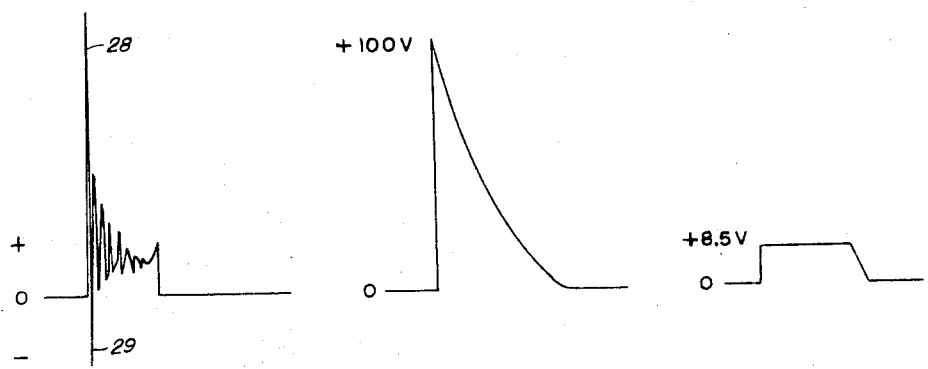
FIGURE 2 is an oscillogram of the voltage waves appearing across the breaker points when opened and as applied to the tachometer circuit.
FIGURE 3 is an oscillogram of the voltage wave as modified and appearing across the shunt condenser of the tachometer circuit.
FIGURE 4 shows the voltage wave after reduction to a fixed value by the clipping action of the second diode.

FIGURE 2 illustrates the character of the voltage pulse which occurs when the contacts 12 of the ignition circuit are opened. The initial high voltage spike 28 is almost immediately followed by a lower negative spike 29, and then a succession of oscillations 30 follow, but because of rectifier 16 and condenser 17 the wave form is reduced to that indicated in FIGURE 3, because the high voltage spike immediately charges condenser 17 through the rectifier, so only positive voltages appear. The condenser, which is of small capacity, approximately .05 microfarad, charges instantaneously to the peak voltage and then slowly discharges, i.e. between pulses, back to zero through resistor 18 and inductance 19. Thus, the voltage in the condenser, at any particular time, is always greater than the voltage of the oscillatory waves and therefore none of them passes through rectifier 16 to be impressed on the pulse-counting circuit.

FIGURE 4 shows the effect of the Zener diode 22 connected across the output of the oscillation suppressing means. This limits the voltage to the Zener or reverse flow value of the diode 22 and is of the order of 8½ volts positive as illustrated in FIGURE 4. The purpose of this is to insure the same magnitude for all impulses, irrespective of the speed of the engine, the voltage of the battery and the condition of the ignition points and sparkplugs. Thus, when the pulses are applied to the condenser 24 to charge it, and the condenser discharged through the A.C. milliammeter 25, the latter acts as a summation device which counts only the number of impulses since they are all of the same potential thus giving an accurate indication in whatever units the meter may be calibrated.

The circuit of FIGURE 1 must be correctly polarized when connected to an ignition system so that ignition pulses pass through rectifier 16 instead of being blocked by it. This requires a certain amount of care and instructions to the user for making the connection, which may include advice that the circuit may be connected across the ignition coil primary rather than across the ignition points, but in any event, in order to eliminate the care required to polarize the circuit connections the arrangement illustrated in FIGURE 5 may be substituted for that in FIGURE 1, and, while this circuit was primarily designed to take care of magnetos which generate alternate positive and negative pulses, such as illustrated in FIGURE 6, it can as well be used on battery ignition and on magnetos which have only primary ignition pulses of one polarity and under either of these circumstances does not have to be polarized when connecting it as does the circuit of FIGURE 1.

Figure 5:
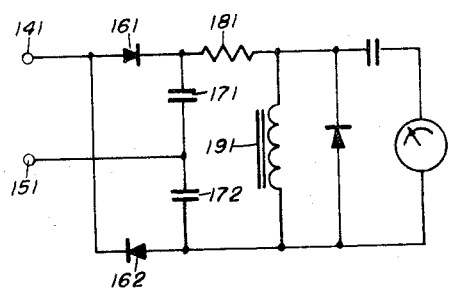
FIGURE 5 is a view similar to FIGURE 1 of a modified circiut for use primarily with magnetos having alternate positive and negative ignition pulses.
Figure 6:
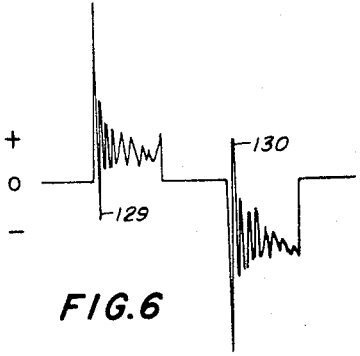
FIGURE 6 is an oscillogram similar to FIGURE 2 for the circuit of FIGURE 5.

The circuit of FIGURE 5 differs from that of FIGURE 1 in the use of two rectifiers 161 and 162 oppositely polarized and connected to input terminal 141 as illustrated. Across the outputs of these two rectifiers are arranged in series the two condensers 171, 172 and to the connection is joined the terminal 151 of the ignition circuit. The output from the two condensers is connected to the oscillation suppression circuit 181, 191 which with the remainder of the circuit is identical with FIGURE 1 and operates in the same manner. It would appear that the pulses as illustrated in FIGURE 6 would alternately charge condensers 171 and 172, but actually they are charged simultaneously by each individual pulse because each one of the latter, though predominately of one polarity, has a bit of a spike of the opposite polarity as indicated at 129 and 130 in FIGURE 6.

Figure 7:
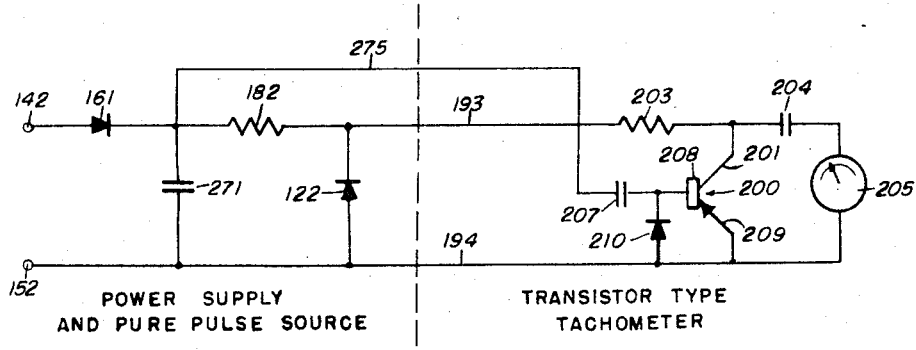
FIGURE 7 is a circuit incorporating the rectifier-condenser input of FIGURE 1 used to supply both power for operating a transistor type tachometer and also for supplying pulses free of oscillatory waves for the signal input to the tachometer.

The rectifier-condenser input circuit used in FIGURES 1 and 5 may be used to supply both power for energizing a transistor type tachometer as well as pure pulses free from oscillatory waves for the signal input to the tachometer and such an arrangement is illustrated in FIGURE 7, where the input terminals 142 and 152 to the circuit are supplied, for instance in the manner illustrated in FIGURE 1 from an ignition circuit. Rectifier 161 and condenser 271 are connected exactly as in FIGURE 1, but condenser 271, instead of being of small capacity, is now of large size, i.e. the order of four microfarads and its output is fed to the Zener diode 122 through resistor 182 and the clipped voltage output from this diode is fed from conductors 193 and 194 to a more or less conventional transistor type tachometer having transistor 200 whose collector electrode 201 is connected to conductor 193 through resistor 203 which comprises a source of pure direct current power of substantially uniform ripple free voltage. This constant voltage also charges condenser 204 through A.C. milliammeter 205, the other terminal of which is connected to conductor 194.

Condenser 271, because of its large capacity, does not discharge down to zero between pulses from the ignition circuit as it does in connection with the embodiments of FIGURES 1 and 5, but discharges slowly by feeding power to Zener diode 122 and to the transistor. The voltage across this condenser is fed directly from its upper or positive terminal through condenser 207 to the base electrode 208 of the transistor. The emitter electrode 209 of the transistor is connected to conductor 194 as shown.

Figure 8:
FIGURE 8 shows the voltage pulses across the shunt condenser of FIGURE 7.

An examination of FIGURE 8 shows the voltage across condenser 271 as varying in pulses between approximately 120 volts and 110 volts, the difference being the loss by discharge between pulses. The 10-volt ripple or pulses from condenser 271 are fed to the transistor through conductor 275 and small condenser 207 which is connected to the base electrode 208. The positive pulse fed through condenser 207 renders the transistor conductive so that it discharges condenser 204 through a milliammeter 205. The positive pulse on the base of the transistor is of short duration and quickly returns to a value of zero. Diode 210 serves as a return to ground of negative pulses thereby keeping them from blocking transistor 200. With the transistor base-electrode again de-energized the voltage is no longer shorted out from the power supply to condenser 204 which is again charged to the regulated voltage value through the meter.

The type of transistor tachometer illustrated to the right of the dotted line in FIGURE 7 is used for illustrative purposes only to illustrate the use of the rectifier-condenser circuit which provides pure pulses free from oscillatory waves and also serves as a power supply for the transistor.

Figure 9:
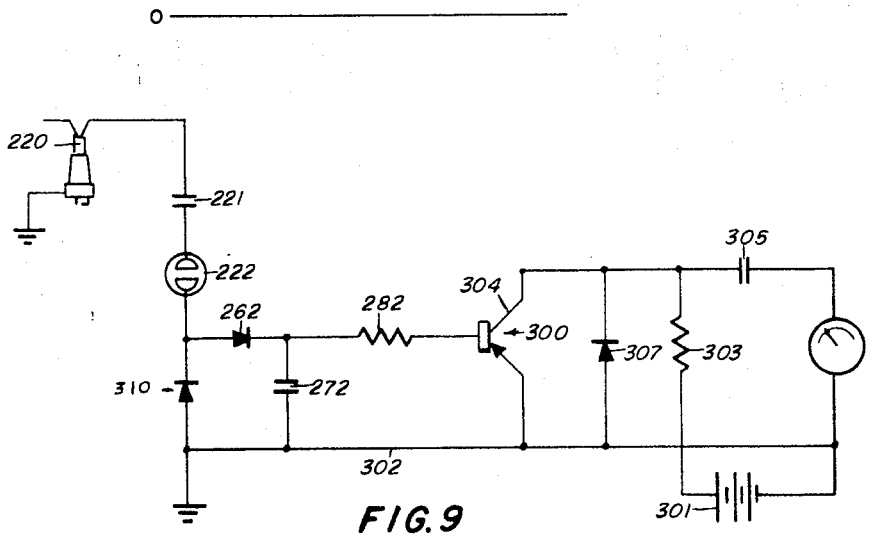
FIGURE 9 is a circuit diagram for a modified rectifier-condenser input to supply clean pulses to a transistor type tachometer from a spark plug.

FIGURE 9 illustrates the further use for the rectifier-condenser input circuit for supplying clean pulses to a transistor type tachometer. In this circuit, however, the pulse supply comes from the high voltage side of the ignition circuit and may be simply connected to the top terminal 220 of a spark-plug. The signal thus achieved is of high voltage and low current and is highly oscillatory in character. It is therefore fed through an isolating condenser 221 of a value of the order of 500 M.M.F. and with 30,000 volt insulation, and a neon lamp 222, the latter helping to keep weak stray signals which might be picked up from other spark plug wires from being imposed on the input circuit, since these signals usually have insufficient power to fire the neon lamp. The rectifier 262 and condenser 272 function as in the embodiment of FIGURE 7, as does the resistor 282 for supplying pulses free from oscillations to the base of transistor 300. As in the previous circuit, the condenser 272 is charged by the first ignition pulse to a value that is higher than the succeeding oscillating wave voltages. The resulting pulse from this condenser, which is thus free of oscillations, is fed through resistor 282 to the base of transistor 300 whereby signals free of oscillatory waves are obtained to drive the transistor tachometer circuit. Rectifier 310 serves as a return to ground of negative pulses which, in this case, may be of high enough voltage to pass through rectifier 262 in the reverse direction and damage it in the absence of the secondary rectifier. The whole circuit illustrated, is intended to make use of the voltage from battery 301 to energize the transistor, one end of the battery being connected to the lower conductor 302 of the condenser-transistor-diode-milliammeter circuit and the other end being applied through resistor 303 for connection to the collector electrode 304 of the transistor and also for charging condenser 305. The Zener diode 307 functions to control the voltage of the battery 301 to regulate the potential applied to the collector electrode. Obviously, this circuit can be modified as was suggested in connection with the embodiment of FIGURE 7 for adaption to variations in the style and connections of the transistor in the tachometer circuit.

I claim:

1. Apparatus for measuring the speed of an internal combustion engine having an electrical ignition system generating oscillatory pulses comprising, in combination, a circuit breaker adapted to be operated in timed relation with the ignition system of a motor, a rectifier and a condenser in series shunting said breaker and connected to receive said pulses and charge the condenser from each one, a resistor and an inductor series connected across said condenser said resistor having a value that enables discharge of said condenser at such a rate that the remaining voltage in the condenser is always greater than the oscillations of the incoming pulse, a Zener diode connected in shunt to said inductance so as to limit each pulse to a fixed voltage value, and a condenser and a milliammeter connected in series and across said Zener diode, the milliammeter acting to sum the pulses and being calibrated in revolutions per minute.

2. The combination set forth in claim 1 in which said source also includes the primary of an ignition coil.

3. The combination set forth in claim 2 in which the secondary of the ignition coil is connected in parallel with the circuit breaker.

4. The combination with a source of oscillatory pulses, said source including a circuit breaker adapted to be operated in synchronism with the ignition pulses of a motor, a condenser, and a pulse counting meter including a voltage regulator, said meter being connected across said condenser, oscillation suppression means interposed between said source and said meter with its associated voltage regulating means, said suppression means including a rectifier poled to pass the principal components of each pulse to be counted, said condenser being in series with said source and said rectifier, and an inductance connected in parallel relation to said condenser for discharging the condenser.

References Cited by the Examiner

UNITED STATES PATENTS

| 2,335,247 | 11/1943 | Hanson | 324—70 |
|---|---|---|---|
| 2,683,813 | 7/1954 | Friedman | 250—71 |
| 2,863,125 | 12/1958 | Doyle | 333—76 |
| 3,064,188 | 11/1962 | Dreiske | 324—70 |

FOREIGN PATENTS

| 843,152 | 8/1960 | Great Britain. |
|---|---|---|
| 355,978 | 9/1961 | Switzerland. |

OTHER REFERENCES

Auto Tachometer Uses Transistor by James Cowan, article in Electronics, August 15, 1958, pages 92, 94.

WALTER L. CARLSON, *Primary Examiner.*

SAMUEL BERNSTEIN, FREDERICK M. STRADER,
*Examiners.*